United States Patent
Dannhaeuser et al.

(10) Patent No.: US 8,132,850 B2
(45) Date of Patent: Mar. 13, 2012

(54) MOTOR VEHICLE REAR END AND ASSOCIATED REAR LIGHT

(75) Inventors: Peter Dannhaeuser, Nuertingen (DE); Martin Konermann, Stuttgart (DE)

(73) Assignee: Daimler AG, Stuttgart (DE)

( * ) Notice: Subject to any disclaimer, the term of this patent is extended or adjusted under 35 U.S.C. 154(b) by 329 days.

(21) Appl. No.: 12/298,899

(22) PCT Filed: Apr. 26, 2007

(86) PCT No.: PCT/EP2007/003677
§ 371 (c)(1), (2), (4) Date: Feb. 5, 2009

(87) PCT Pub. No.: WO2007/124912
PCT Pub. Date: Nov. 8, 2007

(65) Prior Publication Data
US 2009/0195018 A1 Aug. 6, 2009

(30) Foreign Application Priority Data
Apr. 28, 2006 (DE) .......................... 10 2006 019 777

(51) Int. Cl.
*B62D 35/00* (2006.01)

(52) U.S. Cl. .......................... 296/181.5; 296/91; 362/540

(58) Field of Classification Search ............. 296/181.11, 296/181.5, 193.08, 181.1, 187.11, 18.17, 296/91; 362/540
See application file for complete search history.

(56) References Cited

U.S. PATENT DOCUMENTS

| | | | | |
|---|---|---|---|---|
| 2,933,344 A | * | 4/1960 | Shumaker | 296/91 |
| 3,563,598 A | * | 2/1971 | Wilfert et al. | 296/208 |
| 3,591,229 A | * | 7/1971 | Wilfert et al. | 296/91 |
| 3,635,517 A | * | 1/1972 | Wilfert et al. | 296/208 |
| 3,653,709 A | * | 4/1972 | Gravett | 296/91 |
| 4,268,892 A | * | 5/1981 | Pfeiffer et al. | 362/506 |
| 4,838,603 A | | 6/1989 | Masoero et al. | |
| 5,407,245 A | * | 4/1995 | Geropp | 296/180.1 |
| 5,903,389 A | * | 5/1999 | Rumez et al. | 359/509 |
| 6,637,805 B2 | * | 10/2003 | Rees | 296/180.1 |

FOREIGN PATENT DOCUMENTS

| | | |
|---|---|---|
| DE | 10233041 A1 | 2/2004 |
| EP | 1506911 A1 | 2/2005 |
| FR | 2859160 A1 | 3/2005 |

OTHER PUBLICATIONS

International Search Report dated Aug. 2, 2007 (11 Pages).
German Office Action dated Nov. 29, 2006 (3 pages).

* cited by examiner

*Primary Examiner* — Glenn Dayoan
*Assistant Examiner* — Pinel Romain
(74) *Attorney, Agent, or Firm* — Crowell & Moring LLP

(57) ABSTRACT

A motor vehicle rear end is delimited by a rear bulkhead, side wall regions, and a rear cover. An air separation edge extends on the rear cover in the width direction of the motor vehicle. Lateral rear lights are integrated into the motor vehicle rear end, and include means, which are arranged in the side wall regions, for release of the side wall flow, and which extend at a distance below the air separation edge over a height region of the associated rear light (20) and at a distance from the rear bulkhead. At least one opening, through which air flows, is provided in a covering element arranged at the end of an air duct as a means for release of the side wall flow in both side wall regions.

9 Claims, 1 Drawing Sheet

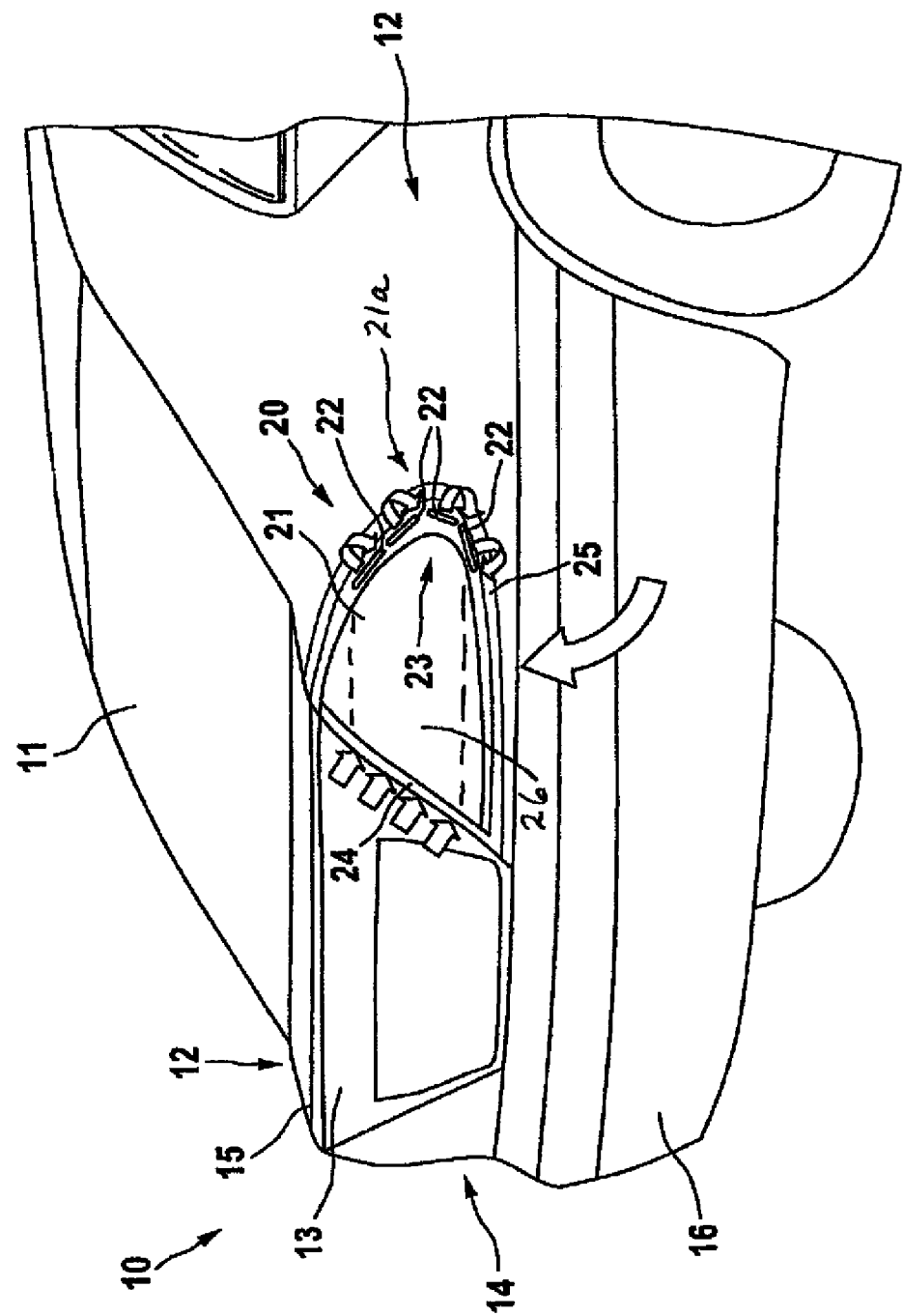

MOTOR VEHICLE REAR END AND ASSOCIATED REAR LIGHT

BACKGROUND AND SUMMARY OF THE INVENTION

This application is a national stage of International Application No. PCT/EP2007/003677, filed Apr. 26, 2007, which claims priority under 35 U.S.C. §119 to German Patent Application No. 10 2006 019 777.1, filed Apr. 28, 2006, the entire disclosure of which is herein expressly incorporated by reference.

The invention relates to a motor vehicle rear end having an associated rear light.

A motor vehicle rear end of the generic type, with integrated rear lights, is disclosed in German patent document DE 102 33 041 A1. This motor vehicle rear end has an air separation edge extending on the rear cover in the width direction of the motor vehicle rear end. The air separation edge is formed by an edged region of transition of the rear cover between its horizontal longitudinal portion and its downwardly angled portion. In order to ensure a targeted stall in the side wall regions of the motor vehicle rear end too, an elongate air outflow opening is provided on both rear sides in the direct extension of the air separation edge. The air outflow opening is located at the end of an air duct in the gap between the circumference of the light housing and the adjoining outer contour of the bodywork. In order to be able to use the drop in pressure at the vehicle rear end for the blowing-out of air at the air outflow openings, the air outflow opening is fluidically connected via the air duct to air inflow openings at which a higher pressure prevails during travel of the vehicle. One of these air inflow openings is arranged in the gap between the underside of the light housing and the adjoining outer contour of the bodywork. An additional air inflow opening can be provided below the bumper lining. The air duct runs within the motor vehicle rear end in the height direction and in the upper region around the circumferential contour of the light housing. As body shell tolerances have to be compensated for during fitting of the rear lights into their bodywork recess, a different gap dimension is obtained for the air inflow or outflow opening depending on the tolerance position. The gap region at the circumference of the light housing between the air inflow and air outflow opening is closed by a rubber profile seal. The circumstance that the cross sections of the air inflow and air outflow opening differ as a function of the tolerance position, as a result of which the air throughput can fluctuate beyond the intended design dimension, may in this case be regarded as a drawback. Troublesome whistling noises can also occur in the case of excessively narrow cross sections.

From large-scale vehicle constructions, a motor vehicle rear end is known in which, in addition to a defined stall at the rear cover, an air separation edge is intended to ensure a defined stall also in the side wall regions of the rearwardly tapering motor vehicle rear end. For this purpose, a spoiler, which extends as a raised bulge over a lower height region of the rear light, is integrated into each of the covering panes of the rear lights integrated into the vehicle rear end. The separation edge of the spoiler runs—at a slight inclination forward—approximately straight. However, the raised bulge of the rear lights may be felt to be troublesome, for example for reasons of style. The bulge of the rear lights can also impede cleaning thereof.

U.S. Pat. No. 4,838,603 discloses arrangements which are intended to prevent dirt from accumulating on the covering panes of rear lights integrated into the motor vehicle rear end. Air ducts, which have air inlets which are arranged on side wall parts of the vehicle rear end and each communicate with a depression which is arranged in the side wall and the cross section of which increases in the direction toward the rear end, are arranged for this purpose on the rear light or on the vehicle rear end. The air ducts lead to air outlets on parts, integrated into the back of the vehicle rear end, of the covering panes of the rear lights. There is no discernible connection to the separation of the air circulation, associated with driving of the vehicle with the headwind, of the motor vehicle.

One object of the invention is to provided an improved motor vehicle rear end which increases design freedom in configuring the side wall regions of the motor vehicle rear end for easy cleaning.

This and other objects and advantages are achieved by the motor vehicle rear end according to the invention in which, although the air outlet openings arranged in the side wall regions are each at a lateral distance from the air separation edge of the rear cover and are located at a horizontal distance before the rear bulkhead, the overflowing of the side wall by headwind is reliably released by the air flow issuing from the air outlet openings. The air outlet openings, which are integrated into the side wall regions, can be arranged flush and configured with a smooth surface, thus allowing easy cleaning of the side wall regions.

According to a particularly preferred embodiment of the invention, the air outlet openings are arranged within parts, integrated into the side wall regions, of covering panes of the rear lights, i.e., the air outlet openings, which are arranged in the covering panes of the rear lights, communicate, during installation of the rear lights on the rear end, with the air ducts arranged in the rear end. This arrangement advantageously allows a configuration of the outer contour of the rear end having a particularly smooth surface. In addition, the air outlet openings have, in accordance with the high precision with which the rear lights and in particular the covering panes thereof are frequently manufactured, a very dimensionally accurate opening cross section.

In order to be able to reduce the wall thickness of the covering panes while maintaining the necessary stability, the air outlet openings arranged in the covering pane form a series of holes, so that connecting webs of the covering pane are preserved between the openings. A roughly C-shaped hole pattern having a C-shaped opening, which is opened in the rearward direction of the vehicle, is preferably provided. This allows the flowing around the side walls to be released over the entire height of the series of holes.

If parts of the covering panes of the rear lights that are integrated into the side wall regions have a front edge which is curved in a roughly semicircular manner, it is readily possible to form a hole pattern which is adapted to a C-shaped edge strip of the covering pane. The depressions of the hole pattern are in this case introduced into the edge strip so as not to restrict the light function of the covering pane.

The drop in pressure, which is dependent on the traveling speed, at the motor vehicle rear end is advantageously used, so that no additional energy is required for feeding the air ducts.

In order to allow, as air issues in the side wall region of the rear light, which is integrated at an angle, a short air duct, an air inflow opening is preferably located in a gap between the rear cover and rear light. Alternatively or additionally, an air inlet opening can be provided below the bumper lining in order to provide an arrangement which is concealed by the bumper lining.

Other objects, advantages and novel features of the present invention will become apparent from the following detailed description of the invention when considered in conjunction with the accompanying drawings.

BRIEF DESCRIPTION OF THE DRAWINGS

The single FIGURE is a perspective view of a motor vehicle rear end, obliquely from the rear right.

DETAILED DESCRIPTION OF THE DRAWINGS

A motor vehicle rear end 10 of a motor vehicle (not shown in its entirety) is configured as a fastback or notchback with an oblique rear pane 11, the motor vehicle rear end tapering backward aerodynamically. The motor vehicle rear end 10 is delimited by two side wall regions 12 laterally enclosing a rear cover 13 and a rear bulkhead 14. The rear cover 13, which is angled over its length, has an air separation edge 15 formed by an edged region of transition between its horizontal longitudinal portion and its downwardly angled portion. The motor vehicle rear end 10 has on both sides, in a mirror-symmetrical arrangement, a respective rear light 20 which laterally adjoins the downwardly angled portion of the rear cover 13 and is guided into the side wall region 12 of the motor vehicle rear 10 around the associated rear corner of the motor vehicle rear end 10. Below the rear lights 20 and the rear cover 13, the motor vehicle rear end 10 has a bumper lining 16 which is fastened to the bodywork of the motor vehicle and covers the lower part of the bulkhead 14.

When the motor vehicle is being driven, a flow of air around the motor vehicle is formed by the headwind. In order to achieve, in addition to the defined stall at the rear cover 13, a targeted stall as a result of the horizontal air separation edge 15 in the side wall region 12 too, slotted openings 22 are formed in a front surface region of a covering pane, which is configured as a covering element 21, of the rear light 20. Although they differ in length, these openings 22 are provided with a single reference numeral in order to simplify the description. The openings 22 form a C-shaped hole pattern 23 which is adapted to the front, roughly semicircular, circumferential contour 21a of the covering pane 21. The openings 22 are configured as air outlet openings and form the end of an air duct (26, shown schematically by dashed lines). The air duct 26 runs within the motor vehicle rear end horizontally around the circumferential contour of the rear light housing. In this case, an air flow flows into the air duct in a gap, which is configured as an air inlet opening 24, between the downwardly angled portion of the rear cover 13 and the adjoining rear light 20. The remaining gap region between the circumference of the light housing and the bodywork is closed by a seal 25. An alternative or additional air duct with an air inlet opening can be provided below the bumper lining. This additional air duct runs, in the vehicle height direction, within the motor vehicle between the bumper lining and the bodywork, in a similar manner to that previously known from DE 102 33 041 A1.

When the vehicle is being driven, a different distribution of pressure is formed in the region of the motor vehicle rear end 10 owing to the flow around the motor vehicle. The air inlet openings 24 and the openings 22 are positioned in such a way that when the vehicle is being driven a higher air pressure prevails at the air inlet opening 24 or each further air inlet opening of the air duct than in the region of the openings 22. Accordingly, when the vehicle is being driven, there occurs a speed-dependent air flow from the air inlet openings to the openings 22.

The alternative or additional flow of air through the air inlet opening, which is guided upward in the air duct along the front side of the bumper lining 16 and fed to the air outlet openings 22, is indicated by a thick arrow.

Air flows in at the air inlet opening 24 over the gap length of this inlet opening 24, as is indicated by a plurality of straight arrows of equal length.

The air duct portion 26, through which the air is introduced from out of the air inlet opening 24, runs on the inside between the light housing and bodywork in a depression, thus ensuring a very short flow path to the lateral openings 22. The duct portion, through which the air alternatively or additionally flows upward out of the skirt of the bumper lining 16, also merges with the air inlet opening in this region.

The air issuing from the slotted openings 22 to release the side wall flow is indicated by backwardly curved arrows.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A motor vehicle rear end, comprising:
   a rear bulkhead and a rear cover which delimit the vehicle rear end;
   an air separation edge which extends on the rear cover in a transverse direction of the motor vehicle;
   rear lights integrated into the motor vehicle rear end; and
   air ducts disposed within the rear end adjoining rear end air outlet openings, which air ducts are arranged such that, when the vehicle is being driven, air flows which are guided via the air ducts, to the air outlet openings, and issue there, lead or contribute to the release of air whirls at the vehicle rear end;
   wherein the air outlet openings are arranged in side wall regions of the rear end, at a horizontal distance from the rear bulkhead and a vertical distance below the air separation edge, and extend over a height region of the rear lights.

2. The motor vehicle rear end as claimed in claim 1, wherein the air outlet openings are arranged in parts of covering panes of the rear lights, which in turn are integrated into the side wall regions.

3. The motor vehicle rear end as claimed in claim 2, wherein the air outlet openings are each arranged in a front edge strip of the covering panes.

4. The motor vehicle rear end as claimed in claim 1, wherein the air outlet openings communicate via the air ducts with at least one air inlet opening which is fed with air from a traveling speed-dependent area of excess pressure at the motor vehicle rear end.

5. The motor vehicle rear end as claimed in claim 4, wherein at least one air inlet opening of the air ducts is formed by a gap laterally next to the rear cover.

6. The motor vehicle rear end as claimed in claim 4, wherein at least one air inlet opening of the air ducts is formed below a bumper lining.

7. A rear light for a motor vehicle rear end having a rear bulkhead and a rear cover which delimit the vehicle rear end, an air separation edge which extends on the rear cover in a transverse direction of the motor vehicle, lateral rear lights integrated into the motor vehicle rear end, and air ducts disposed within the rear end adjoining rear end air outlet openings which are arranged such that, when the vehicle is being driven, air flows which are guided via the air ducts to the air outlet openings, and issue there, lead or contribute to the release of air whirls at the rear end; wherein:
   said rear light comprises a covering pane having a partial region that, in an installed state of the rear light in the rear end of the vehicle, is integrated into a side wall region of the vehicle rear end; and said air outlet openings are arranged in the covering pane in said partial region and, in said installed state of the rear light, communicate with air outlet-side ends of air ducts.

8. The rear light as claimed in claim 7, wherein the openings are arranged in an edge strip which extends over a height of the covering pane and is in front, in the installed state of the rear lights.

9. The rear light as claimed in claim 7, wherein:

the partial region of the covering pane that is integrated in a side wall region of the vehicle rear end in the installed state of the rear light has an approximately semicircular front edge region; and the air outlet openings have a C-shaped hole pattern.

* * * * *